United States Patent
Meng (10) Patent No.: US 9,411,925 B2
(45) Date of Patent: Aug. 9, 2016

(54) SIMULTANEOUSLY VIEWING MULTI PAIRED SCHEMATIC AND LAYOUT WINDOWS ON PRINTED CIRCUIT BOARD (PCB) DESIGN SOFTWARE AND TOOLS

(71) Applicant: Lenovo Enterprise Solutions (Singapore) Pte. Ltd., Singapore (SG)

(72) Inventor: Jian Meng, Kanata (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 87 days.

(21) Appl. No.: 14/252,663

(22) Filed: Apr. 14, 2014

(65) Prior Publication Data

US 2015/0294060 A1    Oct. 15, 2015

(51) Int. Cl.
G06F 17/50    (2006.01)

(52) U.S. Cl.
CPC ........ *G06F 17/5081* (2013.01); *G06F 17/5068* (2013.01)

(58) Field of Classification Search
CPC .......................... G06F 17/5068; G06F 17/5081
USPC ........................... 716/110–111, 118–119, 122
See application file for complete search history.

(56) References Cited

U.S. PATENT DOCUMENTS

| | | | | |
|---|---|---|---|---|
| 6,115,546 A * | 9/2000 | Chevallier | ........... | G06F 17/5081 716/112 |
| 6,757,878 B2 * | 6/2004 | Srinivasan | .......... | G06F 17/5072 716/122 |
| 7,418,683 B1 * | 8/2008 | Sonnard | ............. | G06F 17/5081 716/122 |
| 7,765,508 B1 * | 7/2010 | Roberts | ............... | G06F 17/5045 716/122 |
| 7,865,857 B1 * | 1/2011 | Chopra | ............... | G06F 17/5045 716/119 |
| 8,117,586 B2 | 2/2012 | Sheng | | |
| 8,181,137 B2 * | 5/2012 | Uppaluri | ............. | G06F 17/5022 716/111 |
| 8,261,228 B1 * | 9/2012 | Gopalakrishnan | .. | G06F 17/5036 703/14 |
| 8,370,790 B2 | 2/2013 | Sheng | | |
| 8,397,194 B2 * | 3/2013 | Uppaluri | ............. | G06F 17/5022 716/107 |
| 8,516,399 B2 * | 8/2013 | Paris | ................... | G06F 17/5081 716/136 |
| 8,584,072 B1 * | 11/2013 | Gopalakrishnan | .. | G06F 17/5036 716/111 |
| 8,726,207 B2 * | 5/2014 | Jiang | ................... | G06F 17/5068 716/110 |
| 8,782,577 B2 * | 7/2014 | Fischer | ............... | G06F 17/5068 716/100 |
| 8,930,877 B1 * | 1/2015 | Krasnicki | ........... | G06F 17/5036 716/136 |
| 9,122,384 B1 * | 9/2015 | Kohli | .................. | G06F 3/04842 |

(Continued)

FOREIGN PATENT DOCUMENTS

EP    1930824    6/2008

OTHER PUBLICATIONS

Kung et al., "A Finite-Difference Time-Domain (FDTD) Software for Simulation of Printed Circuit Board (PCB) Assembly," Progress in Electromagnetics Research, Pier 50, 2005, pp. 299-335.

*Primary Examiner* — Stacy Whitmore
(74) *Attorney, Agent, or Firm* — Zilka-Kotab, PC (57) ABSTRACT

A method according to one embodiment includes receiving a printed circuit board design in a memory; generating, using a processor, multiple schematic windows of the printed circuit board design; generating, using the processor, multiple layout windows of the printed circuit board design; and outputting the multiple schematic windows of the printed circuit board design simultaneously with outputting the multiple layout windows of the printed circuit board design. A first of the schematic windows is paired with a first of the layout windows, the paired windows depicting representations of a common sub-portion of the printed circuit board design.

19 Claims, 6 Drawing Sheets

(56) References Cited

U.S. PATENT DOCUMENTS

| | | | |
|---|---|---|---|
| 2004/0117750 A1* | 6/2004 | Skoll | G06F 17/5081 716/111 |
| 2005/0268269 A1* | 12/2005 | Coiley | G06F 17/5045 716/113 |
| 2008/0252311 A1 | 10/2008 | Koh et al. | |
| 2009/0271742 A1* | 10/2009 | Zhang | G06F 9/4443 715/854 |
| 2010/0005438 A1 | 1/2010 | Nakamura | |
| 2011/0276908 A1* | 11/2011 | O'Riordan | G06F 9/4443 715/763 |
| 2012/0023474 A1 | 1/2012 | Ge et al. | |

\* cited by examiner

SIMULTANEOUSLY VIEWING MULTI PAIRED SCHEMATIC AND LAYOUT WINDOWS ON PRINTED CIRCUIT BOARD (PCB) DESIGN SOFTWARE AND TOOLS

BACKGROUND

The present invention relates to printed circuit board (PCB) design software, and more specifically, this invention relates to the pairing of corresponding layout and schematic windows of a printed circuit board (PCB) design.

Current printed circuit board (PCB) design software supports opening only a single layout window. This proves to be limiting especially in terms of user schematic capture, as well as the viewing of both driver and receiver portions of the higher density PCB designs of today. In the event that a hardware designer wants to see both the logical and physical connections of a long trace on a PCB, it is not possible for him/her to zoom in on both driver and receiver portions in a layout window. Instead, the user is limited to traversing the trace of a PCB in the single layout window, zooming in and out multiple times to find the details of a PCB layout.

BRIEF SUMMARY

A method according to one embodiment includes receiving a printed circuit board design in a memory; generating, using a processor, multiple schematic windows of the printed circuit board design; generating, using the processor, multiple layout windows of the printed circuit board design; and outputting the multiple schematic windows of the printed circuit board design simultaneously with outputting the multiple layout windows of the printed circuit board design. A first of the schematic windows is paired with a first of the layout windows, the paired windows depicting representations of a common sub-portion of the printed circuit board design.

A computer program product for generating multiple schematic and layout windows depicting a printed circuit board design, according to one embodiment, includes a computer readable storage medium having program code embodied therewith, the program code executable by a processor to cause the processor to: generate, by the processor, multiple schematic windows of the printed circuit board design; generate, by the processor, multiple layout windows of the printed circuit board design; and output, by the processor, the multiple schematic windows of the printed circuit board design simultaneously with outputting the multiple layout windows of the printed circuit board design. A first of the schematic windows is paired with a first of the layout windows, the paired windows depicting representations of a first common sub-portion of the printed circuit board design. A second of the schematic windows is paired with a second of the layout windows, the paired windows depicting representations of a second common sub-portion of the printed circuit board design, the second common sub-portion of the printed circuit board design being different than the first common sub-portion of the printed circuit board design. Computer code is also provided for causing the processor to perform cross-probing between the paired windows.

A system according to one embodiment includes a processor and logic integrated with and/or executable by the processor. The logic is configured to receive a printed circuit board design in a memory; generate, using a processor, multiple schematic windows of the printed circuit board design; generate, using the processor, multiple layout windows of the printed circuit board design; and output the multiple schematic windows of the printed circuit board design simultaneously with outputting the multiple layout windows of the printed circuit board design. A first of the schematic windows is paired with a first of the layout windows, the paired windows depicting representations of a first common sub-portion of the printed circuit board design. A second of the schematic windows is paired with a second of the layout windows, the paired windows depicting representations of a second common sub-portion of the printed circuit board design, the second common sub-portion of the printed circuit board design being different than the first common sub-portion of the printed circuit board design. Cross-probing is performed between all of the windows showing a representation of a selected component. One of the layout windows depicts an entire layout of the printed circuit board design. Logic is also provided for receiving a user selection of the first sub-portion of the printed circuit board design from the entire layout of the printed circuit board design, and generating the first of the layout windows and the first of the schematic windows upon receiving the user selection.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and the include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for the pairing of corresponding layout and schematic windows, (and their user-selected sub-portions), of a printed circuit board (PCB) design.

In one general embodiment, a method includes receiving a printed circuit board design in a memory; generating, using a processor, multiple schematic windows of the printed circuit board design; generating, using the processor, multiple layout windows of the printed circuit board design; and outputting the multiple schematic windows of the printed circuit board design simultaneously with outputting the multiple layout windows of the printed circuit board design. A first of the schematic windows is paired with a first of the layout windows, the paired windows depicting representations of a common sub-portion of the printed circuit board design.

In one general embodiment, a computer program product for generating multiple schematic and layout windows depicting a printed circuit board design includes a computer readable storage medium having program code embodied therewith, the program code executable by a processor to cause the processor to: generate, by the processor, multiple schematic windows of the printed circuit board design; generate, by the processor, multiple layout windows of the printed circuit board design; and output, by the processor, the multiple schematic windows of the printed circuit board design simultaneously with outputting the multiple layout windows of the printed circuit board design. A first of the schematic windows is paired with a first of the layout windows, the paired windows depicting representations of a first common sub-portion of the printed circuit board design. A second of the schematic windows is paired with a second of the layout windows, the paired windows depicting representations of a second common sub-portion of the printed circuit board design, the second common sub-portion of the printed circuit board design being different than the first common sub-portion of the printed circuit board design. Computer code is also provided for causing the processor to perform cross-probing between the paired windows.

In one general embodiment, a system includes a processor and logic integrated with and/or executable by the processor. The logic is configured to receive a printed circuit board design in a memory; generate, using a processor, multiple schematic windows of the printed circuit board design; generate, using the processor, multiple layout windows of the printed circuit board design; and output the multiple schematic windows of the printed circuit board design simultaneously with outputting the multiple layout windows of the printed circuit board design. A first of the schematic windows is paired with a first of the layout windows, the paired windows depicting representations of a first common sub-portion of the printed circuit board design. A second of the schematic windows is paired with a second of the layout windows, the paired windows depicting representations of a second common sub-portion of the printed circuit board design, the second common sub-portion of the printed circuit board design being different than the first common sub-portion of the printed circuit board design. Cross-probing is performed between all of the windows showing a representation of a selected component. One of the layout windows depicts an entire layout of the printed circuit board design. Logic is also provided for receiving a user selection of the first sub-portion of the printed circuit board design from the entire layout of the printed circuit board design, and generating the first of the layout windows and the first of the schematic windows upon receiving the user selection.

Figure 1:
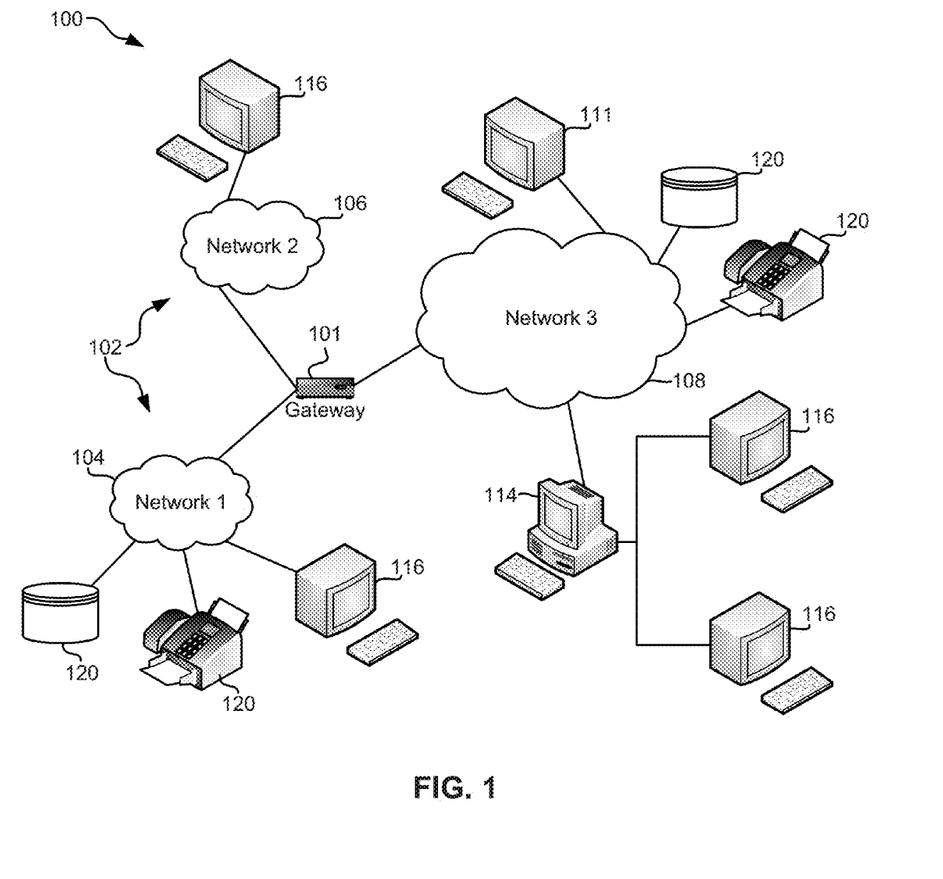
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
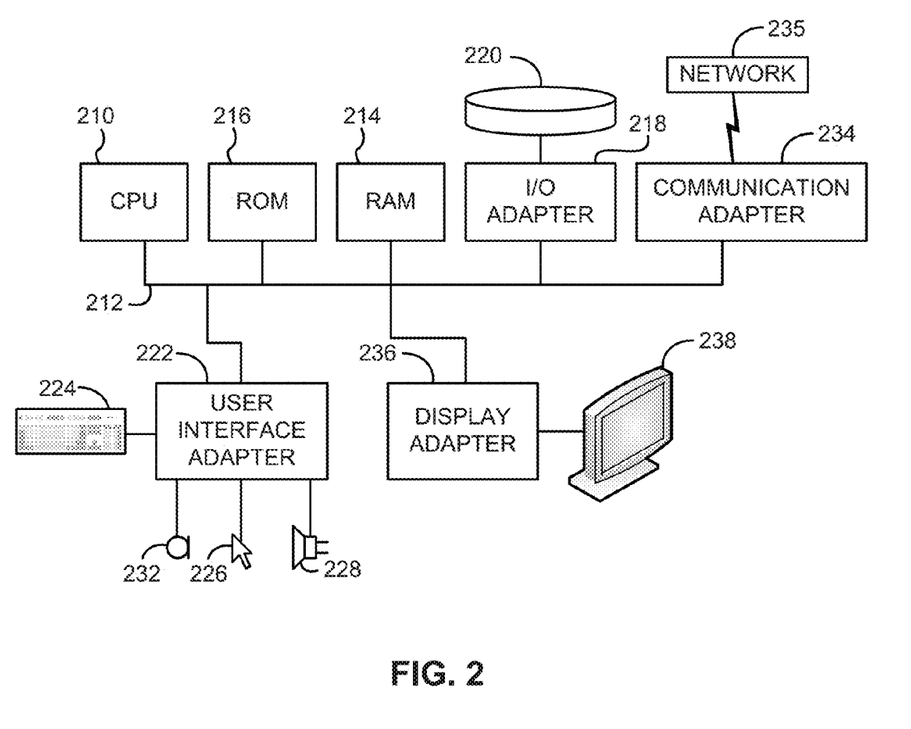
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235

(e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a (preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
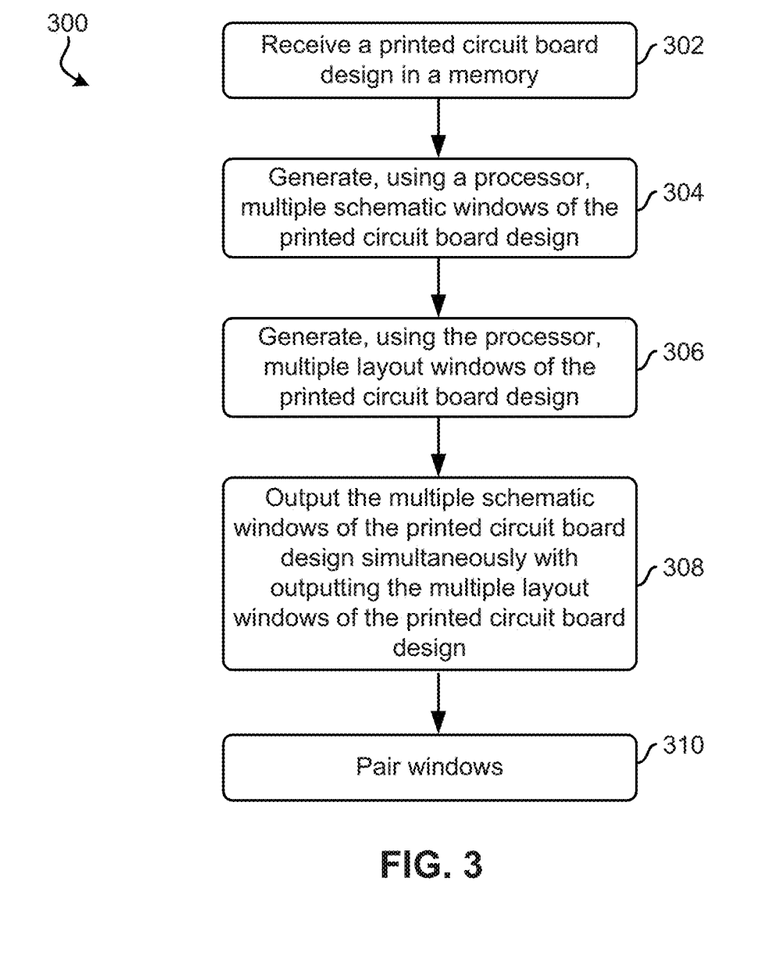
FIG. 3 is a flowchart of a method according to one embodiment.

Referring now to FIG. 3, a flowchart of a method 300 is shown according to one embodiment. The method 300 may be performed in accordance with the present invention in any of the environments depicted in any of the figures, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more processors, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a printed circuit board (PCB) design is received in a memory. In operation 304, multiple schematic windows of the printed circuit board design are generated using a processor, e.g., of a type disclosed herein. Looking to operation 306, using the processor, multiple layout windows of the printed circuit board design are generated. Note that the various windows generated in operations 304 and 306 may be generated sequentially, on demand, etc. In operation 308, the multiple schematic windows of the printed circuit board design are then output simultaneously with outputting multiple layout windows of the printed circuit board design. During such outputting as in operation 308, a first of the schematic windows is paired with a first of the layout windows, the paired windows depicting representations of a common sub-portion of the printed circuit board design, which will be described in greater detail below. Furthermore, the common sub-portion is a smaller portion of the overall schematic or layout of the entire printed circuit board design. In operation 310, pairing of one or more schematic windows to corresponding layout windows, or vice versa, may be performed. The pairs may be selected manually on a one-by-one basis upon receiving user selection. In other approaches, the pairing may be performed automatically. Cross-probing may also be performed.

Figure 4:
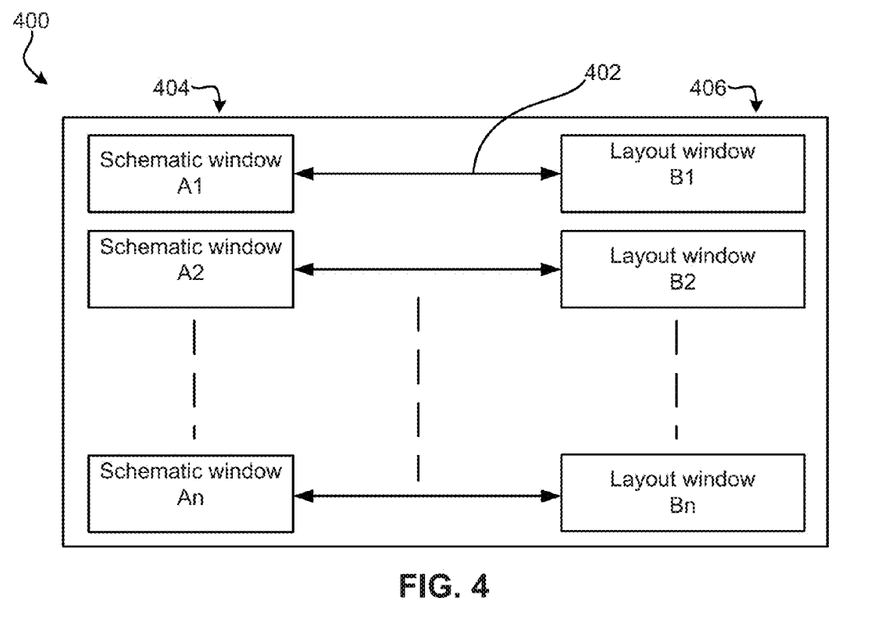
FIG. 4 is a depiction of schematic and layout window pairings.

FIG. 4 depicts a graphical output 400 of schematic and layout window pairings in accordance with one embodiment. As an option, the present graphical output 400 may be implemented in conjunction with features from any other embodiment listed herein, such as those described with reference to the other FIGS. Of course, however, such graphical output 400 and others presented herein ma be used in various applications and/or in permutations which may or may not be specifically described in the illustrative embodiments listed herein. Further, the graphical output 400 presented herein may be used in any desired environment.

Graphical output 400 includes the output pairings 402 of schematic windows 404 and layout windows 406 as described above, and may include a first pairing (A1-B1), a second pairing (A2-B2), up to n-pairings, of a schematic window and a layout window, as illustrated by FIG. 4, where n may be any reasonable number, e.g., 5, 10, 15, etc. Furthermore, the windows in each pair depict representations of a respective common sub-portion of the printed circuit board design. These common sub-portions are each a smaller respective portion of the overall schematic or layout of the entire printed circuit board design, which will be described in greater detail below.

Note also that the number of schematic windows and layout windows may be different various approaches. For example, one illustrative output may include several paired windows, and a layout window without a corresponding paired schematic window. Further, in some approaches, the various windows may be opened and closed separately from the others.

With continued reference to the output pairings 402, cross-probing may be performed, e.g., in order to view in further detail both the logical and physical connections of a long trace on a PCB. Cross-probing may include design, review, verification, testing, etc. between all of the windows 404 and 406, showing a representation of a selected component e.g. traces, hardware, surface components, etc.

The option of cross-probing between paired windows of a PCB design proves advantageous, especially in PCB designs containing long layout traces. This option allows a user to view and compare both the driver and receiver portions of both the schematic and layout views of a PCB simultaneously. Furthermore, a user selection of a component e.g. traces, hardware, surface components, etc. and/or highlight a portion of a PCB layout window may be received, upon which is output the corresponding component e.g. traces, hardware, surface components, etc. and/or highlighted portion of the paired PCB schematic window. Similarly, a user-selection of a component e.g. traces, hardware, surface components, etc. and/or highlight a portion of a PCB schematic window may be received, upon which is output the corresponding component e.g. traces, hardware, surface components, etc. and/or highlighted portion of the paired PCB layout window.

For example, by viewing details of both logical and physical connections on both driver and receiver ends simultaneously, if a designer sees two traces crossing on the layout window, normally, this is not a good topology to route the traces on PAB design. The designer can highlight and cross probe between the two paired windows (e.g., showing the driver end and receiver end). In this way, it is easier to determine how to make logical changes on the design schematic to avoid the crossing of two traces in the layout window.

Cross-probing may further be performed between any active layout window and any active schematic window. Such active layout and schematic windows may be open in the same monitor or in separate monitors.

While cross-probing is preferably performed between paired windows, in some approaches cross-probing may be performed between a second (B2) of the layout windows 406 and a second (A2) of the schematic windows 404, the second of the layout windows 406 and the second of the schematic windows 404 not being paired windows 402.

Conventional PCB software limits a user in that he/she has only the option of opening a single PCB layout window on a monitor and viewing either a complete PCB layout overview or a single zoomed view of a portion of a PCB layout.

Embodiments described herein however allow a user to zoom in on the driver and receiver ends of both schematic and layout windows, with the option of displaying multiple separate windows containing schematic and layout views of a PCB design on a monitor. Furthermore, a user is able to view and capture these multiple windows, which may include very detailed signals of the schematics, as well as physical pins and vias of the layouts.

Figure 5A:
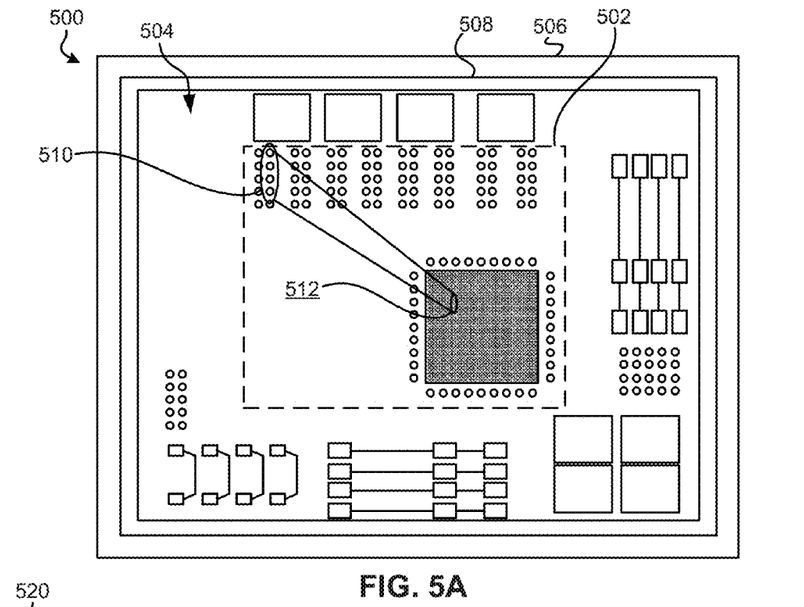
FIG. 5A is a depiction of a graphical output of an entire printed circuit board.
Figure 5B:
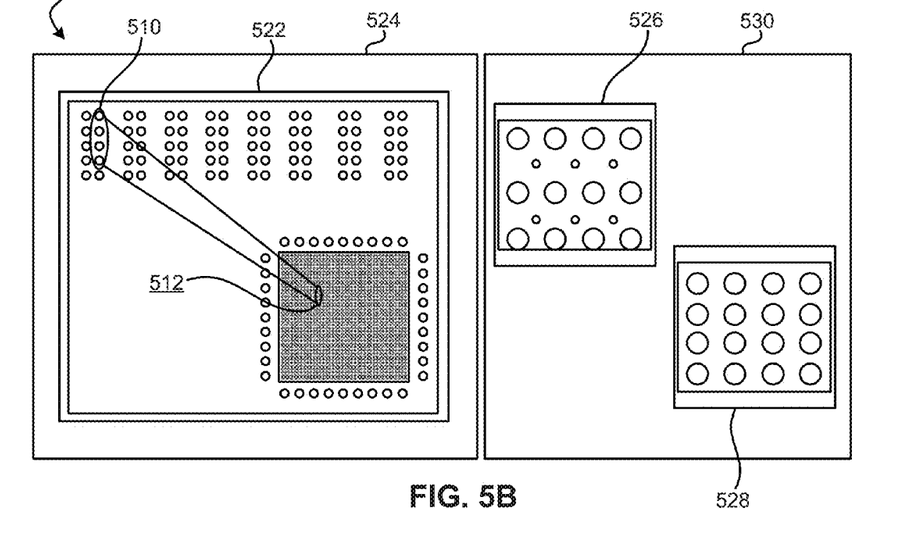
FIG. 5B is a depiction of printed circuit board (PCB) layout windows in multiple windows according to one embodiment.
Figure 5C:
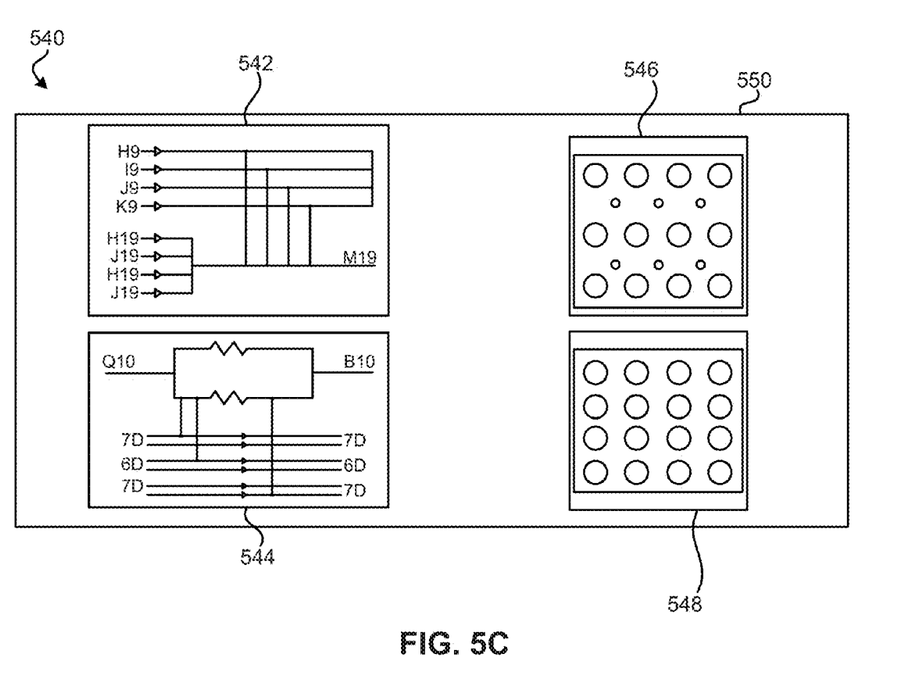
FIG. 5C is a depiction of schematic and layout sub-portion window pairings.

FIGS. 5A-5C depict illustrative graphical outputs 500, 520, 540 in accordance with several embodiments. As an option, the present graphical outputs 500, 520, 540 may be implemented in conjunction with features from any other embodiment listed herein, such as those described with reference to the other FIGS. Of course however, such graphical outputs 500, 520, 540 and others presented herein may be used in various applications and/or in permutations which may or may not be specifically described in the illustrative embodiments listed herein. Further, the graphical outputs 500, 520, 540 presented herein may be used in any desired environment.

Graphical output 500 of FIG. 5A includes a window 508 on a computer monitor 506, where the window 508 depicts an entire layout of a printed circuit board (PCB) 504. Selection of a sub-portion 502 of the printed circuit board design may be received from a user. From this user selected sub-portion 502, a first of the layout windows and a first of the schematic windows may be generated as will be described in greater detail below. Additionally, additional and/or alternative user selected sub-portions 510 and 512 may be received.

Referring now to FIG. 5B, graphical output 520 is presented on a first monitor 524, which outputs a window 522 illustrating a more detailed view of sub-portion 502 of FIG. 5A of the printed circuit board design. Furthermore, a user may select sub-portions 510, 512 of the sub-portion (502 of FIG. 5A) of the printed circuit board design (504 of FIG. 5A). A second, third, fourth, etc. layout window corresponding to the user-selected sub-portion(s) of the sub-portion may then be generated. For example, layout windows 526, 528 may be generated and output to show the user-selected sub-portions 510, 512 of the printed circuit board design.

In further embodiments, with continued reference to FIG. 5B, selection of one sub-portion 510 of the printed circuit board design may cause automatic selection of another sub-portion 512 that is connected to the user-selected sub-portion 510. For example, selection of a driver portion may cause automatic selection of a receiver portion of the printed circuit board design. Moreover, detailed schematic layout view 526, 528 and/or layout views may be generated automatically and/or on demand.

Similarly, a second, third, fourth, etc. schematic window corresponding to the selected sub-portion(s) of a schematic sub-portion of a printed circuit board design may be generated and paired with the schematic windows, as will be described in FIG. 5C.

According to various embodiments, multiple windows may be simultaneously output to one monitor 524 and/or multiple monitors 524, 530. Moreover, in various approaches, the windows may be repositioned, resized, moved from monitor to monitor, etc.

A user may select a sub-portion as described above using a mouse, keyboard, touchpad, etc. or similar user interface tools. The selected sub-portion may be delineated by a box, circle, oval, etc. area of the PCB design. Additionally, user interface elements may be presented to allow a user to open new windows, select additional optional window configurations, perform cross-probing, etc. The user interface elements may be of any type known in the art, such as drop down menus, pop-up menus, drag and drop ability, window size quandranting (e.g., snap function), etc. Additional optional window configurations may be generated and displayed on a monitor(s) based on an existing window view. For example a user may select from a menu to display a layout window that corresponds and is then paired with a schematic window. Likewise, a user may select from the menu to display a schematic window that corresponds and is then paired with an open layout window.

Referring now to FIG. 5C, graphical output 540 illustrates multiple schematic windows 542, 544 of the printed circuit board design output simultaneously while outputting the multiple layout windows 546, 548 of the printed circuit board design. Layout windows may be displayed on a single monitor 550, or multiple monitors. As mentioned in the description of FIG. 4, the first of the schematic windows 542 is paired with a first of the layout windows 546, the paired windows 542, 546 depicting representations of a first common sub-portion of the printed circuit board design.

Similarly, a second of the schematic windows 544 is paired with a second of the layout windows 548, the paired windows 544, 548 depicting representations of a second common sub-portion of the printed circuit board design.

The second common sub-portion of the printed circuit board design may be different than the first common sub-portion of the printed circuit board design. In another approach, the second common sub-portion of the printed circuit board design may be a sub-portion of the first common sub-portion.

The option of depicting multiple sub-portions of a PCB is advantageous especially in terms of schematic capture of a PCB design. Where previous approaches were limited to capturing a single view of a PCB layout, various embodiments including the option of displaying multiple user selected sub-portions of a PCB layout as well as the entire PCB allow presentation of both detailed portions (schematics and layouts) as well as an overview of a PCB simultaneously.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable program able read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves (propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirety on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a printed circuit board design in a memory;
   generating, using a processor, multiple schematic windows of the printed circuit board design;
   generating, using the processor, multiple layout windows of the printed circuit board design;

outputting the multiple schematic windows of the printed circuit board design simultaneously with outputting the multiple layout windows of the printed circuit board design, wherein a first of the schematic windows is paired with a first of the layout windows, the paired windows depicting representations of a common sub-portion of the printed circuit board design; and receiving user selection of the sub-portion of the printed circuit board design shown in one of the windows via direct user interaction with the one of the windows, and automatically selecting a second sub-portion that is connected to the selected sub-portion.

2. The method of claim 1, comprising performing cross-probing between all of the windows showing a representation of a selected component.

3. The method of claim 1, comprising performing cross-probing between a second of the layout windows and a second of the schematic windows, the second of the layout windows and the second of the schematic windows not being paired windows.

4. The method of claim 1, wherein the windows are simultaneously output to multiple monitors connected to a same computer housing the processor.

5. The method of claim 1, wherein one of the layout windows depicts an entire layout of the printed circuit board design, and comprising receiving a user selection of the sub-portion of the printed circuit board design by indication of the sub-portion by the user via an interface tool that selects the sub-portion directly from the depicted entire layout of the printed circuit board design, and generating the first of the layout windows and the first of the schematic windows upon receiving the user selection.

6. The method of claim 1, comprising receiving a user selection of a sub-portion of the sub-portion of the printed circuit board design depicted in the first of the layout windows corresponding to an area delineated by at least one of a box, a circle and an oval created using a mouse coupled to the processor, and generating a second of the layout windows corresponding to the selected sub-portion of the sub-portion.

7. The method of claim 6, comprising generating a second of the schematic windows corresponding to the sub-portion of the sub-portion and outputting the second schematic window simultaneously with the first layout window and the second layout window.

8. The method of claim 1, comprising automatically selecting a second sub-portion of the printed circuit board design connected to the sub-portion of the printed circuit board design depicted in the first of the windows, and generating a second of the layout windows depicting representations of the second sub-portion of the printed circuit board design.

9. A computer program product for generating multiple schematic and layout windows depicting a printed circuit board design, the computer program product comprising a computer readable storage medium having program code embodied therewith, the program code executable by a processor to cause the processor to:

generate, by the processor, multiple schematic windows of the printed circuit board design;

generate, by the processor, multiple layout windows of the printed circuit board design;

output, by the processor, the multiple schematic windows of the printed circuit board design simultaneously with outputting the multiple layout windows of the printed circuit board design;

wherein a first of the schematic windows is paired with a first of the layout windows, the paired windows depicting representations of a first common sub-portion of the printed circuit board design, wherein a second of the schematic windows is paired with a second of the layout windows, the paired windows depicting representations of a second common sub-portion of the printed circuit board design, the second common sub-portion of the printed circuit board design being different than the first common sub-portion of the printed circuit board design; and performing cross-probing between the paired windows.

10. The computer program product of claim 9, comprising program code executable by the processor to cause the processor to perform cross-probing between all of the windows showing a representation of a selected component.

11. The computer program product of claim 9, comprising program code executable by the processor to cause the processor to perform cross-probing between a third one of the layout windows and a third one of the schematic windows while simultaneously outputting the first and second schematic windows and the first and second layout windows, the third one of the layout windows and the third one of the schematic windows not being paired windows; and comprising program code executable by the processor to cause the processor to perform cross-probing between all of the windows simultaneously showing a representation of a selected component.

12. The computer program product of claim 9, wherein the windows are simultaneously output to multiple monitors connected to a same computer housing the processor.

13. The computer program product of claim 9, wherein one of the layout windows depicts an entire layout of the printed circuit board design, and comprising program code executable by the processor to cause the processor to receive a user selection of the sub-portion of the printed circuit board design from user interaction directly in the layout window having the depiction of the entire layout of the printed circuit board design via a user interface tool, and program code executable by the processor to cause the processor to generate the first of the layout windows and the first of the schematic windows upon receiving the user selection.

14. The computer program product of claim 9, comprising program code executable by the processor to cause the processor to receive a user selection of a sub-portion of the sub-portion of the printed circuit board design depicted in the first of the layout windows, and generate a second of the layout windows corresponding to the selected sub-portion of the sub-portion.

15. The computer program product of claim 14, comprising program code executable by the processor to cause the processor to generate a second of the schematic windows corresponding to the sub-portion of the sub-portion and outputting the second schematic window simultaneously with the first layout window and the second layout window.

16. The computer program product of claim 9, comprising program code executable by the processor to cause the processor to automatically select a third sub-portion of the printed circuit board design connected to the first sub-portion of the printed circuit board design depicted in the first of the layout windows, and program code executable by the processor to cause the processor to generate a third one of the layout windows depicting representations of the third sub-portion of the printed circuit board design.

17. A system, comprising:

a processor and logic integrated with and/or executable by the processor, the logic being configured to:

receive a printed circuit board design in a memory;

generate, using a processor, multiple schematic windows of the printed circuit board design;

generate, using the processor, multiple layout windows of the printed circuit board design;

output the multiple schematic windows of the printed circuit board design simultaneously with outputting the multiple layout windows of the printed circuit board design; and wherein a first of the schematic windows is paired with a first of the layout windows, the paired windows depicting representations of a first common sub-portion of the printed circuit board design, wherein a second of the schematic windows is paired with a second of the layout windows, the paired windows depicting representations of a second common sub-portion of the printed circuit board design, the second common sub-portion of the printed circuit board design being different than the first common sub-portion of the printed circuit board design;

performing cross-probing between all of the windows showing a representation of a selected component;

wherein one of the layout windows depicts an entire layout of the printed circuit board design, receiving a user selection of the first sub-portion of the printed circuit board design from user interaction directly in the layout window having the depiction of the entire layout of the printed circuit board design via an interface tool; and generating the first of the layout windows and the first of the schematic windows upon receiving the user selection.

18. The system of claim 17, wherein the windows are simultaneously output to multiple monitors.

19. The system of claim 17, comprising receiving a user selection of a sub-portion of the sub-portion of the printed circuit board design depicted in the first of the layout windows, and generating a second of the layout windows corresponding to the selected sub-portion of the sub-portion.

* * * * *